US011132517B2

(12) United States Patent
Qian et al.

(10) Patent No.: US 11,132,517 B2
(45) Date of Patent: Sep. 28, 2021

(54) USER INTERFACE FOR NATURAL LANGUAGE TRANSLATION USING USER PROVIDED ATTRIBUTES

(71) Applicant: Lenovo (Singapore) Pte. Ltd., Singapore (SG)

(72) Inventors: Ming Qian, Cary, NC (US); Song Wang, Cary, NC (US); Jian Li, Durham, NC (US); Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 139 days.

(21) Appl. No.: 16/451,248

(22) Filed: Jun. 25, 2019

(65) Prior Publication Data

US 2020/0410057 A1 Dec. 31, 2020

(51) Int. Cl.
*G06F 40/58* (2020.01)
*G06F 40/51* (2020.01)

(52) U.S. Cl.
CPC .............. *G06F 40/58* (2020.01); *G06F 40/51* (2020.01)

(58) Field of Classification Search
CPC ................................. G06F 40/51; G06F 40/58
USPC ............................................................ 704/3
See application file for complete search history.

(56) References Cited

U.S. PATENT DOCUMENTS

| 2005/0288919 | A1* | 12/2005 | Wang | ....................... | G06F 40/55 |
| | | | | | 704/2 |
| 2016/0259760 | A1* | 9/2016 | Gusakov | ............. | G06K 9/00442 |
| 2017/0091177 | A1* | 3/2017 | Sonoo | ..................... | G10L 13/08 |

FOREIGN PATENT DOCUMENTS

| JP | 2012190166 A | * | 10/2012 |
| JP | 5185343 B2 | * | 4/2013 |

OTHER PUBLICATIONS

F. Wong and K. K. Leung, "The Design of Web Based Machine Translation Server Based on Grid Infrastructure," 2008 Fourth International Conference on Networked Computing and Advanced Information Management, Gyeongju, 2008, pp. 713-718, doi: 10.1109/NCM.2008.35. (Year: 2008) (Year: 2008).*
Tu et al., "Context Gates for Neural Machine Translation," Transactions of the Association for Computational Linguistics, vol. 5, pp. 87-99, Mar. 2017.
Lin et al., "ORANGE: a Method for Evaluating Automatic Evaluation Metrics for Machine Translation," COLING '04 Proceedings of the 20th international conference on Computational Linguistics, Article No. 501, Geneva, Switzerland, Aug. 23-27, 2004, 7 pages.

* cited by examiner

*Primary Examiner* — Bharatkumar S Shah
(74) *Attorney, Agent, or Firm* — VanLeeuwen & VanLeeuwen; Jason A. Friday

(57) ABSTRACT

An approach is provided to use a first translation attribute that is received at a user interface from a user to automatically translate a document. The source document that is in a source natural language is translated to a target document that is in a target natural language by using a machine translator that utilizes the first translation attribute, such as adequacy or fluency. The target document is analyzed with the analysis resulting in a second translation attribute (e.g., either adequacy or fluency, whichever is different from the first translation attribute). The target (translated) document and the second translation attribute are then provided to the user, such as at the user interface.

17 Claims, 6 Drawing Sheets

USER INTERFACE FOR NATURAL LANGUAGE TRANSLATION USING USER PROVIDED ATTRIBUTES

BACKGROUND

Automatic document translation from one natural language to another, while considerably less expensive and time consuming than human-based translations, is inherently flawed with either or both adequacy or fluency suffering in the resulting translation. In translations, adequacy is how much information is accurately translated from the source language to the target language, while fluency is a rating of how "good" the target translation is to read by people fluent in the target language. While some studies have determined that better fluency is generally preferred to better adequacy, proper adequacy of a translation is important for the target audience to fully understand the source material that is being translated.

Traditional automatic ("machine") translators are generally not customizable or configurable between various translation considerations, such as adequacy and fluency. These traditional machine translators, therefore, generally only have one target translation that can result from a given source document. Given the target audience of the target translation, such an inflexible resulting target translation document often does not meet the target audience's expectations and can result in a lower opinion of the work that was translated.

SUMMARY

An approach is provided to use a first translation attribute that is received at a user interface from a user to automatically translate a document. The source document that is in a source natural language is translated to a target document that is in a target natural language by using a machine translator that utilizes the first translation attribute, such as adequacy or fluency. The target document is analyzed with the analysis resulting in a second translation attribute (e.g., either adequacy or fluency, whichever is different from the first translation attribute). The target (translated) document and the second translation attribute are then provided to the user, such as at the user interface.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
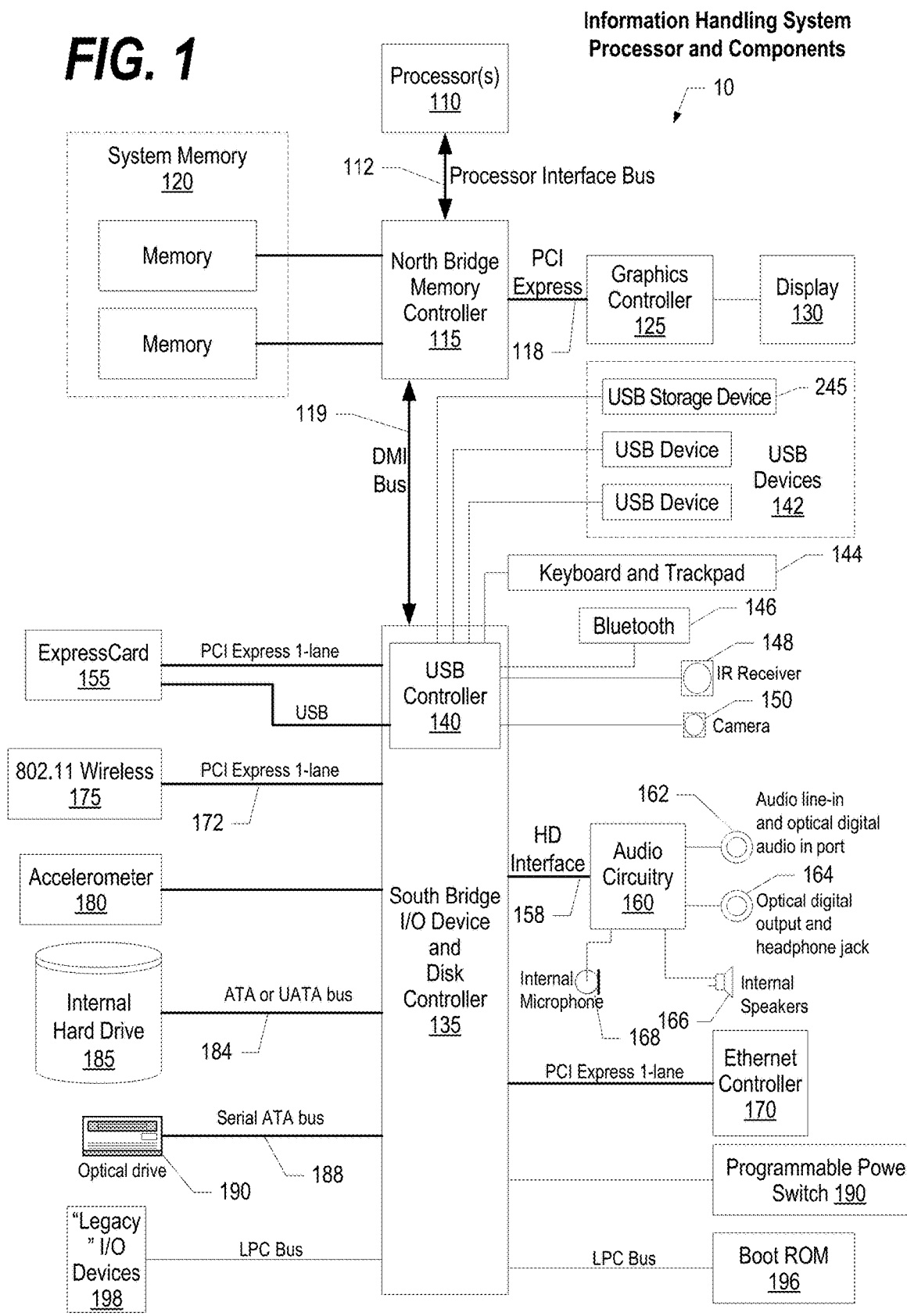
FIG. 1 is a block diagram of a data processing system in which the methods described herein can be implemented.
Figure 2:
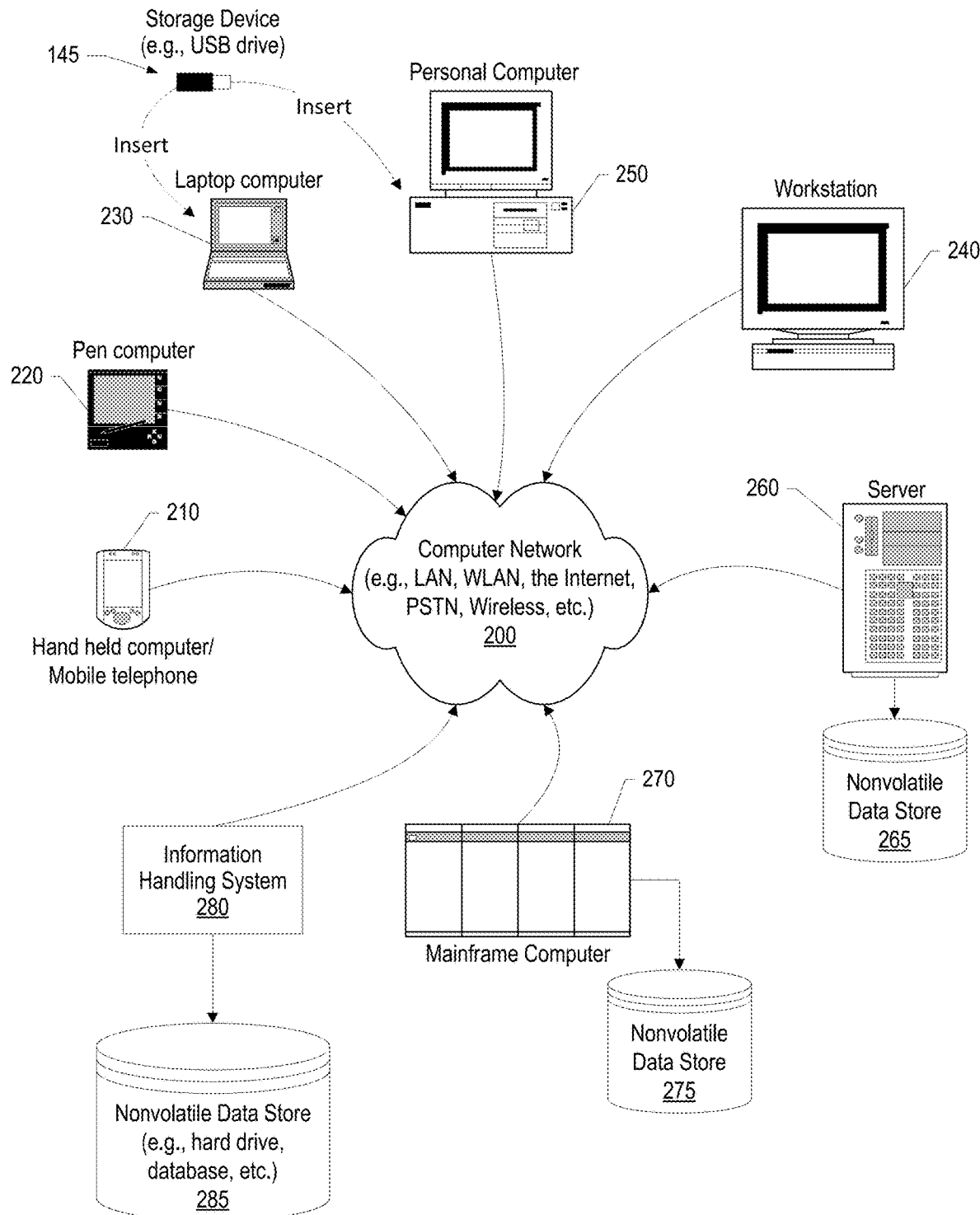
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
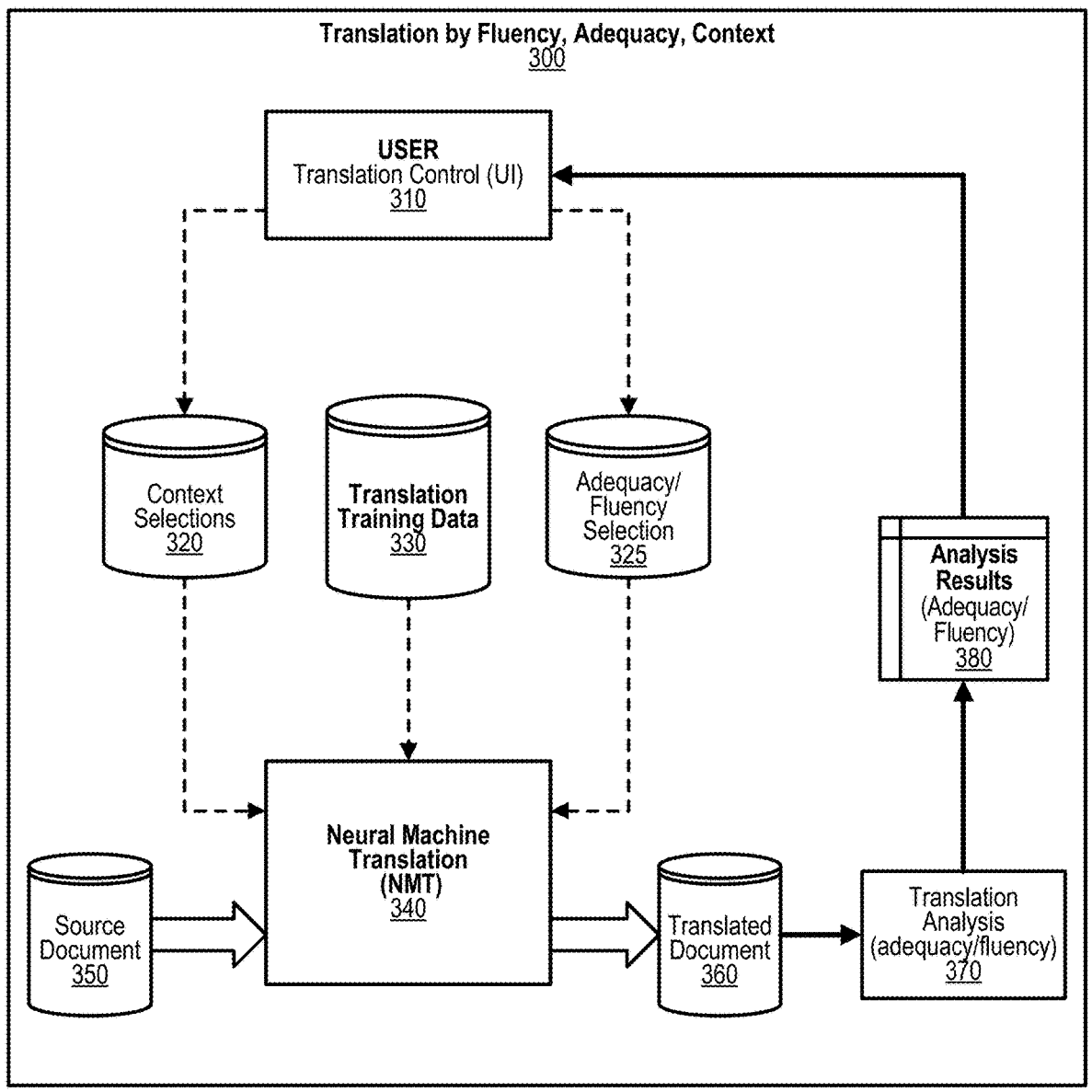
FIG. 3 is a component diagram depicting the components used in utilizing a user interface to perform natural translation using user provided attributes.

FIG. 3 is a component diagram depicting the components used in utilizing a user interface to perform natural translation using user provided attributes. System 300 provides natural language translations based on fluency, adequacy, and context. User 300 utilizes a user interface to provide a translation attribute that is received at the system. The translation attribute is either an adequacy value that the user desire of the translation or a fluency value that the user desires of the translation. Source document 350 that is written in a source natural language to translated document 360 that is in a target natural language. Adequacy is a measure of how much information is transferred from source document 350 to translated document 360, while fluency is a measure of how "good" translated document 360 is when read by a person fluent in the target language. In one embodiment, the user selects either the desired adequacy attribute value or the desired fluency attribute value with the system analyzing the documents and determining the attribute not selected by the user. In other words, if the user requests a "high" fluency attribute value, then the system will perform the translation and inform the user of the resulting adequacy attribute value based on the translation. Likewise, if the user requests a "high" adequacy attribute value, then the system will perform the translation and inform the user of the resulting fluency attribute value based on the translation. As shown, the adequacy or fluency level (attribute value) selected by the user is provided at UI 310 and stored in data store 325 for use by machine translator 340.

In one embodiment, the user can also make context selections that are used to determine the translation training data that are used by machine translator 340 when performing the translation. The context selections made by the user are stored in data store 320 and the resulting translation data source is stored in data store 330. For example, if a legal type document is being translated, the user could make context selections indicating the context of the translation, such as specifying layman terms if the target audience is the general public, or strict legal terminology if the target audience is the legal profession. Other types of context selections can be made based on the environment, the source document content, and the desired audience of the target (translated) document.

Process 370 analyzes the translation process using the translated document and also the source document as input sources. The translation analysis results in a translation attribute that is provided to the user along with the translated document text. Using adequacy and fluency as the translation attributes, whichever attribute is specified by the user (e.g., fluency), the other translation attribute (e.g., adequacy) is determined by process 370 and provided to the user. In this manner, the user might request that the fluency attribute be set to a high value (e.g., a "five" on a five-point scale) and analysis 370 might determine that, in order to achieve a "five" in fluency, the adequacy of the resulting translated document is quite low (e.g., a "one" on the same five-point scale). Using this information, the user might decide to adjust the fluency down to a "four" and the resulting translated document, when analyzed, might be determined to have a "three" as an adequacy attribute value. Consequently, the user might decide to have slightly less fluency in order to achieve the higher adequacy attribute value. The analysis results are stored in memory area 380 and returned to user interface 310 where they are provided (e.g., displayed, etc.) to the user.

In one embodiment, the translation process might be recursive with adjustments made to the context selections in order to adjust the translation attribute to the level desired by the user. For example, using the example from above, the user-specified context selections might be initially used and result in a translation that has a fluency translation attribute value of "three" rather than "five." The system can then automatically adjust the context selections to drive the desired translation value in the direction specified by the user (e.g., add or delete keywords that are the context words that are stored as context selections 320, etc.). This adjustment of context words can continue with the source document being repeatedly translated from the source natural language to the target natural language until the user-specified translation attribute is met. When the user-specified translation attribute is met, then the process provides the other translation attribute (e.g., the adequacy translation attribute value when the fluency translation attribute value was specified by the user, etc.) back to the user by utilizing user interface 310.

Figure 4:
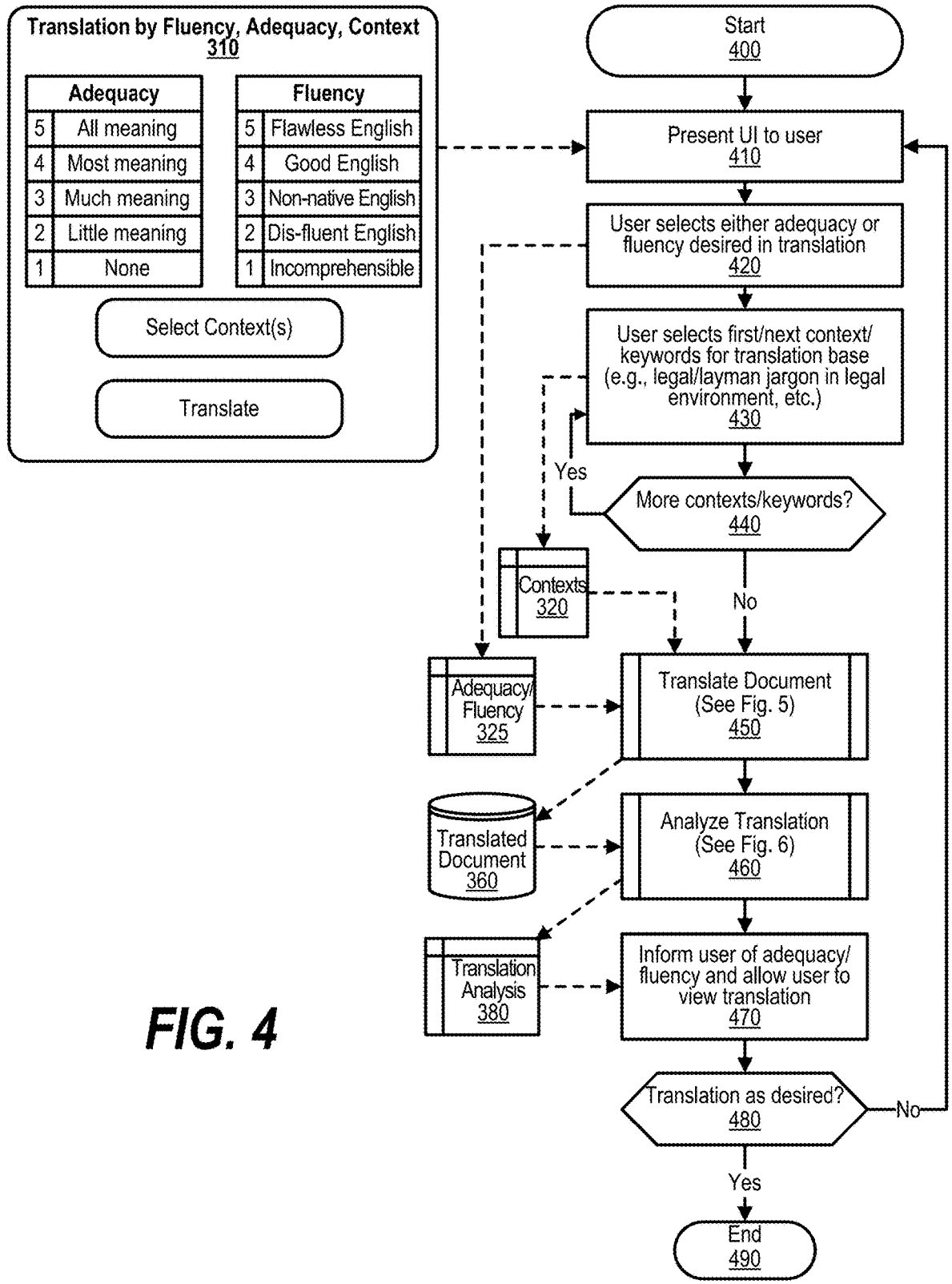
FIG. 4 is a flowchart showing steps taken by a process that utilizes a user interface to perform natural translation using user provided attributes.

FIG. 4 is a flowchart showing steps taken by a process that utilizes a user interface to perform natural translation using user provided attributes. FIG. 4 processing commences at 400 and shows the steps taken by a process that provides natural language translations based on fluency, adequacy, and context. At step 410, the process presents user interface 310 to the user. At step 420, the process receives the user's selection of either the user's desired adequacy translation attribute value or the user's desired fluency translation attribute value.

In the example shown, the user selects from either the "adequacy" selection box or the "fluency" selection box with each attribute selection being shown in a five-point scale. Other sliding scale ranges can of course be used based on the level of granularity desired. The machine translator will generate a resulting translation of the source document in the source natural language to the target (translated) document in the target natural language that meets the translation attribute specified by the user. The selected translation attribute value is stored in memory area 325.

At step 430, the users selects the first context words that the machine translator is to use in the translation base (e.g., legal terminology vs. layman jargon in a legal environment, etc.). The selected context words are stored in context memory area 320. The process determines as to whether the user wishes to select more context words to use to build the translation base (decision 440). If the user wishes to select more context words to use to build the translation base, then decision 440 branches to the 'yes' branch which loops back to step 430 to receive the next context words from the user. This looping continues until the user is finished entering context words, at which point decision 440 branches to the 'no' branch exiting the loop.

Figure 5:
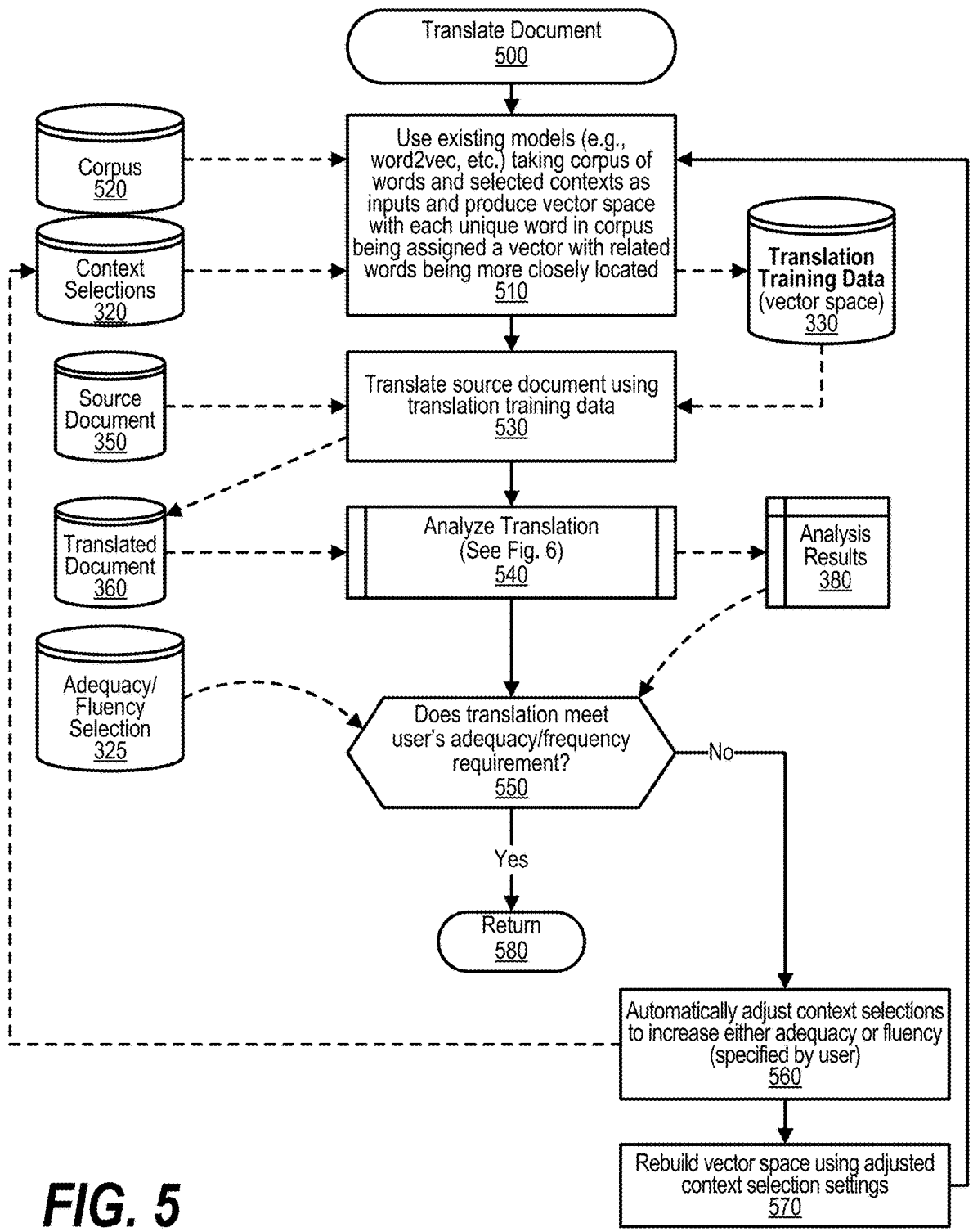
FIG. 5 is a flowchart showing steps taken by a translation process that automatically translates a source document written in a source natural language to a target document that is in a target natural language.

At predefined process 450, the process performs the Translate Document routine (see FIG. 5 and corresponding text for processing details). This routine takes the context words from memory area 320 and the translation attribute selection from memory area 325 as inputs and automatically generates translated document 360 that is written in the target natural language. At predefined process 460, the process performs the Analyze Translation routine (see FIG. 6 and corresponding text for processing details). This routine takes target document 360 and the source document as inputs and results in translation analysis data that is stored in memory area 380.

At step 470, the process informs user of adequacy/fluency and allow user to view translation, for example by highlighting the level in the corresponding selection box shown in user interface 310. The process determines as to whether the resulting translation is as desired by the user after providing the user with the resulting translation attribute values as well as access to translated document 360 (decision 480). If the translation is acceptable (as desired by the user), then decision 480 branches to the 'yes' branch whereupon processing ends at 490. On the other hand, if the resulting translation is not as desired, then decision 480 branches to the 'no' branch whereupon processing loops back to receive the user's adjustments to the translation attribute value as well as any modifications the user wishes to make to the context words. This looping continues until the user is satisfied with the resulting translation, at which point decision 480 branches to the 'yes' branch exiting the loop.

FIG. 5 is a flowchart showing steps taken by a translation process that automatically translates a source document written in a source natural language to a target document that is in a target natural language. FIG. 5 processing commences at 500 and shows the steps taken by a process that translates a document from a source natural language to a target natural language using user-provided translation attributes and context words. At step 510, the process uses existing models (e.g., word2vec, etc.) taking corpus of words and selected context words as inputs and produces a vector space with each unique word in the corpus being assigned a vector with related words being more closely located. The corpus of words is retrieved from data store 520 and the context words selected by the user are retrieved from data store 320. Step 510 outputs translation data source 330 which is a vector space that is used by the machine translator to perform the automatic translation.

At step 530, the process translates source document 350 that was written in a source natural language using translation data source 330 using a machine translator. The machine translator stores the resulting translated document in data store 360 with the translated document being written in the target natural language. At predefined process 540, the process performs the Analyze Translation routine (see FIG. 6 and corresponding text for processing details). This routine takes the translated document, and in some cases the source document, as inputs and results in analysis results that are stored in memory area 380.

The process determines whether the translation meets the user's adequacy or frequency (the translation attribute) requirement (decision 550). If the resulting document does not meet the user's desired translation attribute value, then decision 550 branches to the 'no' branch to perform steps 560 and 570 before looping back to step 510 to reperform the routine using adjusted context words. This looping continues with adjustments being made to the context words until the user's desired translation attribute is met, at which point decision 550 branches to 'yes' branch and the process returns to the calling routine (see FIG. 4) at 580.

When the resulting document does not meet the user's desired translation attribute value, then steps 560 and 570 are performed. At step 560, the process automatically adjusts the context words to increase either the adequacy or the fluency (the translation attribute that was specified by the user). At step 570, the process rebuilds the vector space using the adjusted context words by looping back to step 510 and re-performing the processing described above. This looping continues until the desired translation attribute level is met, at which point decision 550 branches to the 'yes' branch and processing returns at 580.

Figure 6:
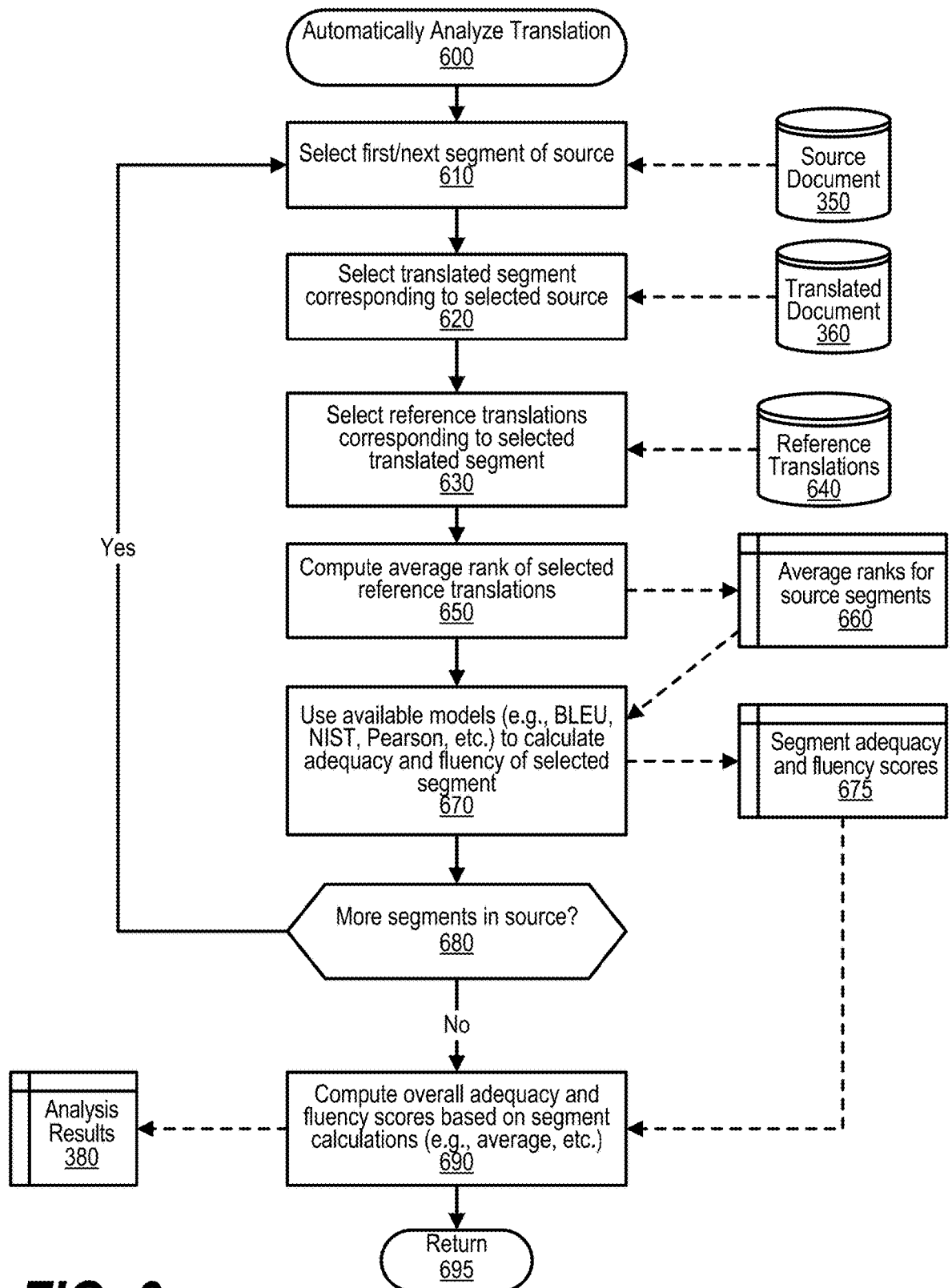
FIG. 6 is a flowchart showing a process that analyzes the target translation document to ascertain adequacy and fluency of the target translation.

FIG. 6 is a flowchart showing a process that analyzes the target translation document to ascertain adequacy and fluency of the target translation. FIG. 6 processing commences at 600 and shows the steps taken by a process that automatically analyzes a translation resulting from the machine translator with the analysis resulting in both the translation adequacy attribute value and the translation fluency attribute value of the machine translation. At step 610, the process selects the first segment of the source document from data store 350. At step 620, the process selects the translated segment that corresponds to the selected source segment with the translated segment being retrieved from data store 360.

At step 630, the process selects the reference translations that correspond to the selected translated segment with the reference translations being retrieved from data store 640. At step 650, the process computes the average rank of selected reference translations for the selected segment and stores the average rank data in memory area 660. At step 670, the process uses available models (e.g., BLEU, NIST, Pearson, etc.) to calculate the adequacy and fluency values corresponding to the selected segment. These segment-based adequacy and fluency values are stored in memory area 675.

The process determines as to whether there are more segments in the source document yet to process (decision 680). If there are more source segments to process, then decision 680 branches to the 'yes' branch which loops back to step 610 to select and process the next segment from the source document as described above. This looping continues until all of the segments have been processed, at which point decision 680 branches to the 'no' branch exiting the loop. At step 690, the process computes the overall adequacy and fluency values of the translation based on the segment calculations. In one embodiment, the computation is made by averaging the segment calculations. These translation attribute values are stored in memory area 380. FIG. 6 processing thereafter returns to the calling routine (see FIGS. 4 and 5) at 695.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method comprising:
    receiving, at a user interface, a set of one or more context words from a user, wherein an evaluation of the context words results in a first translation attribute;
    automatically translating a source document from a source natural language to a target document in a target natural language using a machine translator that utilizes the first translation attribute;
    analyzing the target document, wherein the analysis results in a second translation attribute;
    in response to one of the translation attributes failing to reach a threshold:
        re-performing the automatic translation wherein the re-performed automatic translation utilizes a modified set of context words and results in an adjusted target document;
        analyzing the adjusted target document, wherein the analysis of the adjusted target document results in an adjusted first translation attribute and an adjusted second translation attribute value; and
        providing the adjusted target document and the adjusted second translation attribute to the user.

2. The method of claim 1 wherein the first and second translation attributes are each selected from a group consisting of a language adequacy value and a language fluency value.

3. The method of claim 2 further comprising:
    selecting a translation data source from a corpus of words, wherein the selection of the translation data source is based on the received set of context words, wherein the machine translator utilizes the translation data source to perform the translating.

4. The method of claim 2 further comprising:
    selecting a translation data source from a corpus of words, wherein the selection of the translation data source is based on the received set of context words, wherein the machine translator utilizes the translation data source to perform the translating; and
    comparing the resulting first translation attribute value to the first translation attribute.

5. The method of claim 1 further comprising:
    repeatedly performing the adjusting, the re-performing, the analyzing, and the comparing until the comparison reveals that the resulting first translation attribute value meets the first translation attribute.

6. The method of claim 5 further comprising:
    providing the target document and the adjusted second translation attribute to the user.

7. An information handling system comprising:
    one or more processors;
    a memory coupled to at least one of the processors; and
    a set of computer program instructions stored in the memory and executed by at least one of the processors in order to perform actions comprising:
        receiving, at a user interface, a set of one or more context words from a user, wherein an evaluation of the context words results in a first translation attribute;
        automatically translating a source document from a source natural language to a target document in a target natural language using a machine translator that utilizes the first translation attribute;
        analyzing the target document, wherein the analysis results in a second translation attribute;

in response to one of the translation attributes failing to reach a threshold:
re-performing the automatic translation wherein the re-performed automatic translation utilizes a modified set of context words and results in an adjusted target document;
analyzing the adjusted target document, wherein the analysis of the adjusted target document results in an adjusted first translation attribute and an adjusted second translation attribute value; and
providing the adjusted target document and the adjusted second translation attribute to the user.

8. The information handling system of claim 7 wherein the first and second translation attributes are each selected from a group consisting of a language adequacy value and a language fluency value.

9. The information handling system of claim 8 wherein the actions further comprise:
selecting a translation data source from a corpus of words, wherein the selection of the translation data source is based on the received set of context words, wherein the machine translator utilizes the translation data source to perform the translating.

10. The information handling system of claim 8 wherein the actions further comprise:
selecting a translation data source from a corpus of words, wherein the selection of the translation data source is based on the received set of context words, wherein the machine translator utilizes the translation data source to perform the translating, and wherein the analysis also results in a first translation attribute value; and
comparing the resulting first translation attribute value to the first translation attribute.

11. The information handling system of claim 7 wherein the actions further comprise:
repeatedly performing the adjusting, the re-performing, the analyzing, and the comparing until the comparison reveals that the resulting first translation attribute value meets the first translation attribute.

12. The information handling system of claim 11 wherein the actions further comprise:
providing the target document and the adjusted second translation attribute to the user.

13. A computer program product comprising:
a computer readable storage medium, comprising computer program code that, when executed by an information handling system, performs actions comprising:
receiving, at a user interface, a set of one or more context words from a user, wherein an evaluation of the context words results in a first translation attribute;
automatically translating a source document from a source natural language to a target document in a target natural language using a machine translator that utilizes the first translation attribute;
analyzing the target document, wherein the analysis results in a second translation attribute;
in response to one of the translation attributes failing to reach a threshold:
re-performing the automatic translation wherein the re-performed automatic translation utilizes a modified set of context words and results in an adjusted target document;
analyzing the adjusted target document, wherein the analysis of the adjusted target document results in an adjusted first translation attribute and an adjusted second translation attribute value; and
providing the adjusted target document and the adjusted second translation attribute to the user.

14. The computer program product of claim 13 wherein the first and second translation attributes are each selected from a group consisting of a language adequacy value and a language fluency value.

15. The computer program product of claim 14 wherein the actions further comprise:
selecting a translation data source from a corpus of words, wherein the selection of the translation data source is based on the received set of context words, wherein the machine translator utilizes the translation data source to perform the translating.

16. The computer program product of claim 14 wherein the actions further comprise:
selecting a translation data source from a corpus of words, wherein the selection of the translation data source is based on the received set of context words, wherein the machine translator utilizes the translation data source to perform the translating, and wherein the analysis also results in a first translation attribute value; and
comparing the resulting first translation attribute value to the first translation attribute.

17. The computer program product of claim 13 wherein the actions further comprise:
repeatedly performing the adjusting, the re-performing, the analyzing, and the comparing until the comparison reveals that the resulting first translation attribute value meets the first translation attribute; and
providing the target document and the adjusted second translation attribute to the user.

* * * * *